Oct. 25, 1932.  C. A. ZORN  1,884,494
SYSTEM OF DRAFTING DRESS PATTERNS
Filed March 5, 1928
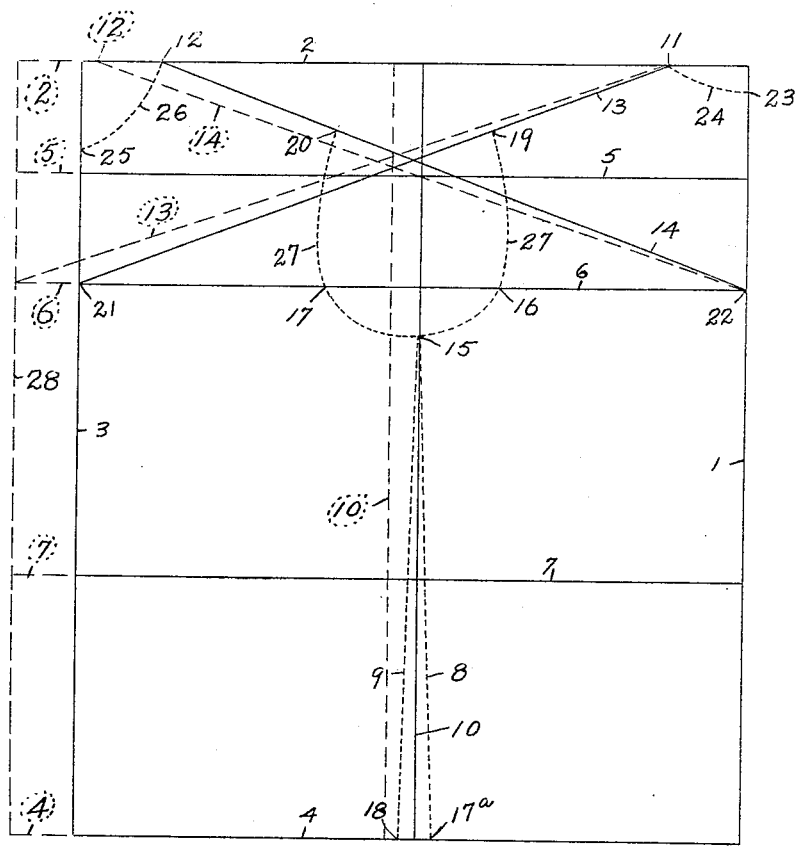
INVENTOR
Charles A. Zorn
By Edward E. Longan
ATTY.

Patented Oct. 25, 1932

1,884,494

UNITED STATES PATENT OFFICE

CHARLES A. ZORN, OF ST. LOUIS, MISSOURI

SYSTEM OF DRAFTING DRESS PATTERNS

Application filed March 5, 1928. Serial No. 259,034.

My invention relates to improvements in system of drafting dress patterns, and has for its primary object the system of drafting dress patterns in which the slope of the shoulder will vary according to the size of the dress and in which the shoulder line is always properly defined.

A further object is the system of drafting dress patterns in which one-half of the back pattern and the front pattern are drawn and then by the simple tracing off of these halves on a sheet of folded paper, the entire back half or the entire front half of the pattern can be cut out.

In the drawing:

The figure illustrates the system of drafting the waist pattern.

In the drafting of the pattern, I will first describe the waist, the sizes shown being for a regular 36.

The first step is to draw a rectangle composed of lines 1, 2, 3 and 4, the lines 1 and 3 representing the center of the back and the center of the front respectively, while line 2 represents the top line or top point of the neck and line 4 the hip line. The lines 1 and 3 are 24 inches long and the lines 2 and 4 are 21 inches long.

After these lines have been drawn, care being taken that a perfect rectangle is formed, I measure down from the line 2 and along the lines 1 and 3 a distance of 3½ inches and connect these points with a line 5, which is the blade line. I then measure down from the line 5 seven inches and draw the chest line 6, which is parallel to lines 2 and 5. Then at a distance of 16 inches from the line 6 is drawn the waist line 7, this line being parallel to lines 2, 5 and 6. Lines 5, 6 and 7 are also, of course, parallel to the line 4. I next draw a vertical line parallel to the lines 1 and 3. This vertical line is so located that it is one-fourth of an inch off center, being ½ inch closer to the line 1 than the line 3. In other words, in the drawing illustrated the line 10, which is the vertical line, is 10¼ inches from the center of the back and 10¾ inches from the center of the front.

Along the line 2 and inwardly from the lines 1 and 3, I next make points 11 and 12, these points being spaced inwardly 2½ inches from the lines 1 and 3 respectively.

From the point 12 to the point 22, which is where the line 6 meets the line 1, is drawn a diagonally extending line 14 and from the point 11 to the point 21, being the meeting of lines 6 and 3, is drawn the line 13. This gives the shoulder slope.

Along the line 1 and downward from the line 2, a distance of three-quarters of an inch, is marked a point 23. This point is connected by a curved dotted line 24, forming one-half of the rear part of the neck opening.

Downward from the line 2 and along the line 3 and at a distance of 2¾ inches is placed a point 25, the points 12 and 25 being connected by a curved line, preferably dotted, 26. Measuring along the chest line from the point where the line 10 intersects the same and toward the line 1, a distance of 2½ inches, is placed a point 16, and measuring a distance of 3 inches along the chest line and toward the line 3 is a point 17.

Also measuring along the lines 13 and 14 from the points 11 and 12 respectively a distance of 6 inches are placed points 19 and 20 respectively, and at a distance of 1½ inches on the line 10 and downward from the line 6 is a point 15. The points 19, 16, 15, 17 and 20 are connected by a curved dotted line 27, which is of sufficient size to make the arm hole, this being varied according to the size of the arm. In the ordinary 36, the length of this line would be 18 inches.

On the line 4 and to either side of the line 10 are placed points 17a and 18 each about one-half an inch from the line 10. These points are connected to the point 15 by means of lines 8 and 9 respectively. This completes the draft for the waist pattern.

In making the pattern proper a sheet of paper is folded over upon itself and the line 1 laid along the folded edge. The pattern is then traced off in the following manner:

The line 4 is commenced at the point 18 and drawn or traced until the meeting point of this line with the line 1 is reached. The line 1 being along the fold of the paper is not traced. Next commencing at the point 23, the arcuate or curved line 24 is traced until it meets the point 11. Then, the line 13 is traced down to the point 19 after which the contour of the line 27 is traced till it meets the point 15. Then the point 15 is connected to the point 18 by the line 9.

The layout is then removed from the folded sheet of paper which folded sheet is then cut along the lines traced after which the sheet is opened, and the complete back pattern is finished.

In laying out the front pattern the same procedure is followed, that is the line 3 is laid along the folded edge of a sheet of paper which has been doubled upon itself. The line 4 is then drawn from the point 17a to the point where this line meets the line 3.

Then commencing at the point 25 the curved line 26 is traced until it meets the point 12. From there the shoulder line 14 is followed down to the point 20, and the line 27 is followed to the point 15, and the points 15 and 17 are connected by the line 8. Then after this layout has been removed, the front pattern is cut out in a similar manner. Thus, we have the two halves of the pattern.

In this layout I wish to state that allowance is made in the pattern for all seams except the shoulder seam, and when cutting out the cloth from the pattern additional goods must be allowed for the shoulder seam.

The foregoing pattern has been drafted for a standard size 36, the various dimensions having been determined from long experience and with thousands of figures, and being about the average dimensions for the average build. Where it is desired to draft a pattern for a different size garment, the distances between the top of the pattern and the lines 6, 7 and 4, respectively are maintained constant, but the other distances are changed in the following degree, the sizes being determined from the bust measurement, as for example, the size 36″ bust would be considered as size 36 pattern:

| Sizes | 36 | 38 | 40 | |
|---|---|---|---|---|
| | Inches | Inches | Inches | |
| Neck | 2½ | 2⅝ | 2¾ | (Vary by ⅛″) |
| Shoulder | 6 | 6⅛ | 6¼ | (Vary by ⅛″) |
| Front arm | 3 | 3¼ | 3½ | (Vary by ¼″) |
| Back arm | 2½ | 2¾ | 3 | (Vary by ¼″) |
| Back blade | 7⅞ | 8⅛ | 8⅜ | (Vary by ¼″) |
| Front blade | 8⅛ | 8⅜ | 8⅝ | (Vary by ¼″) |
| Arm hole | 18 | 18½ | 19 | (Vary by ½″) |

Should the person for whom this pattern is being made be round shouldered, the point 19 is raised and the point 20 lowered, preferably about ¼ of an inch. This will tend to throw the shoulder seam forward so that it will appear in the proper place on the wearer. If the party for whom the pattern was made has very large hips, the points 17a and 18 are moved farther apart thereby creating more fullness at the hips.

It will also be noted from the figure that I have placed a dash line 28 at a distance from the line 3. This, of course, would mean a wider pattern and it will be noted that as the pattern increases in width, the shoulder slope decreases in inclination so that by my system of layout or pattern drafting, the shoulder slope automatically varies as the size of the garment increases.

I wish it to be particularly understood that in the drawing the solid lines are what I term "basic lines", while the dotted lines may be termed "optional lines". By this I mean that the basic lines are fixed whereas the optional lines may have their contours changed within certain limits. In other words the lines 24, 26, 27, 8 and 9 may be moved from their position as shown to take care of certain variations necessary in the pattern. In all events the fixed lines are first sketched in and then the optional lines or dotted lines drawn in afterward. However, the method or system of laying out or drafting the patterns is not changed nor do the dimensions of the fixed lines and their distances from each other vary for a standard pattern. Practically the only changes necessary are to provide for the hip measurement, the arm holes and the neck opening in the waist pattern.

Having fully described my invention, what I claim is:—

The method of drafting dress patterns, which consists in drawing a rectangle of predetermined length equal to the distance from the top of the shoulder to the hip and of a width equal to one-half the bust size, drawing across said rectangle a chest line at a predetermined distance below and parallel to the top line of said rectangle, measuring inwardly along said top line of the rectangle a predetermined distance from each side edge based upon the size of the neck opening to locate the outermost points of the shoulders, and then connecting each of said points with diagonal lines extending from the same to the furthermost points of intersection, respectively, of the chest line with the side edge lines, said diagonal lines determining the slope of the shoulders, and the shoulder slopes thereby decreasing proportionately and automatically according to increasing width of the pattern.

In testimony whereof I have affixed my signature.

CHARLES A. ZORN.